United States Patent [19]

Herke

[11] 4,417,756
[45] Nov. 29, 1983

[54] THREAD LOOPING MACHINE

[76] Inventor: Donald P. Herke, 3474 N. Chatsworth, St. Paul, Minn. 55112

[21] Appl. No.: 287,866

[22] Filed: Jul. 28, 1981

[51] Int. Cl.³ .............................................. D03J 3/00
[52] U.S. Cl. .......................................... 289/2; 289/17
[58] Field of Search ............................... 289/1.5, 2, 17

[56] References Cited

U.S. PATENT DOCUMENTS

| | | | |
|---|---|---|---|
| 1,192,878 | 8/1916 | Ewing | 289/17 |
| 2,145,439 | 1/1939 | Torrence | 289/17 X |
| 2,246,217 | 6/1941 | Noling | 289/2 X |
| 2,332,655 | 10/1943 | Miles | 289/17 X |
| 2,810,228 | 10/1957 | Braley | 289/17 |
| 2,856,970 | 10/1958 | Benedict | 289/17 X |
| 3,520,566 | 7/1970 | Bovigny | 289/17 |
| 3,706,466 | 12/1972 | Landry et al. | 289/17 |
| 3,752,517 | 8/1973 | Warmack | 289/17 |
| 4,333,614 | 6/1982 | Flax | 289/17 |
| 4,336,960 | 6/1982 | Seki | 289/17 |

Primary Examiner—Louis Rimrodt
Attorney, Agent, or Firm—Schroeder, Siegfried, Vidas & Arrett

[57] ABSTRACT

A thread looping machine having a frame mechanism with a longitudinal guideway over which a carriage slidably moves and supports a dependent member for holding a vise to secure the work so that a bail mechanism receives thread under tension that has been coated with an adhesive substance, and a drive mechanism rotates the bail mechanism to form successive loops around the work being held in the vise to secure the same.

11 Claims, 6 Drawing Figures

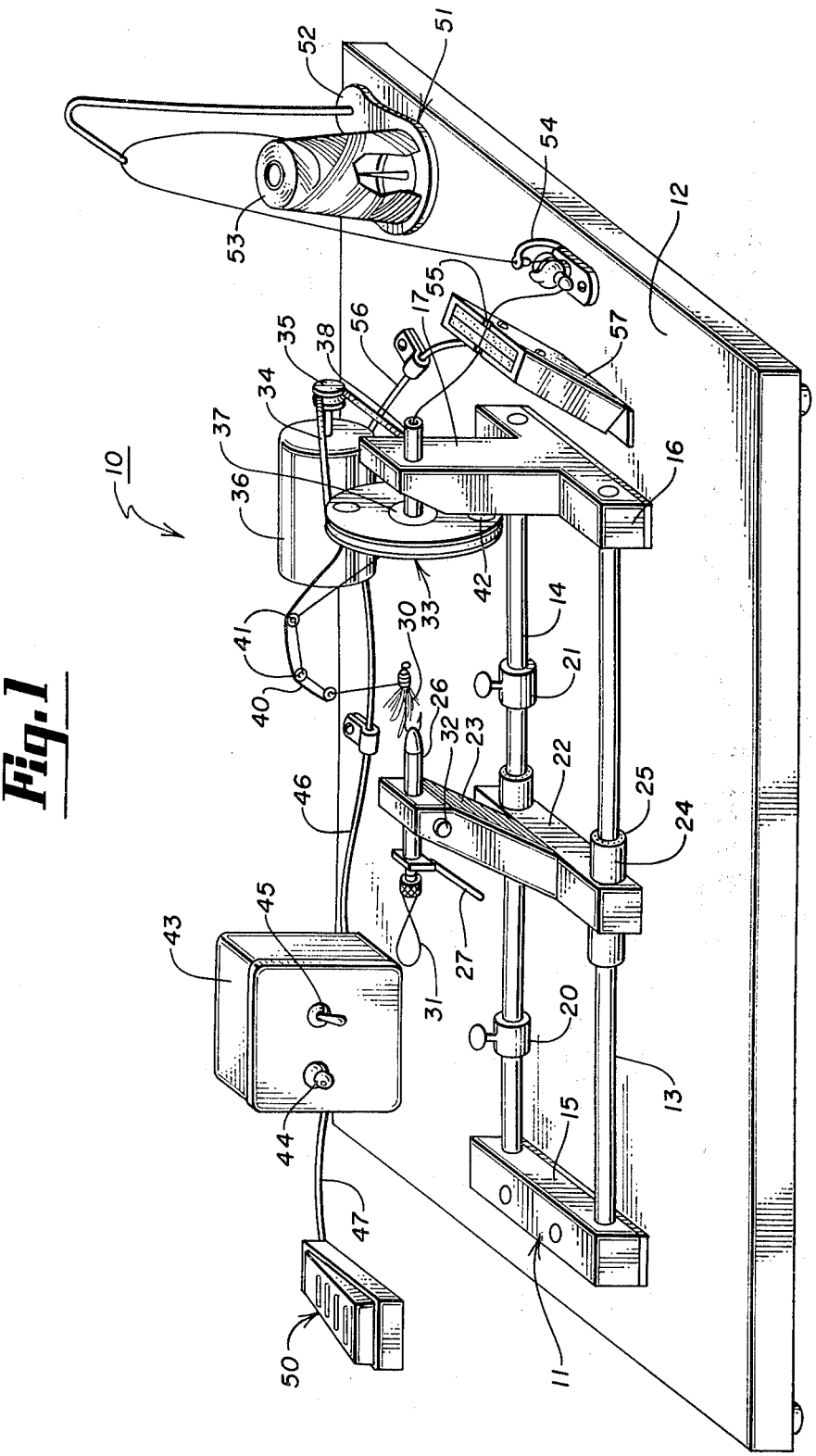

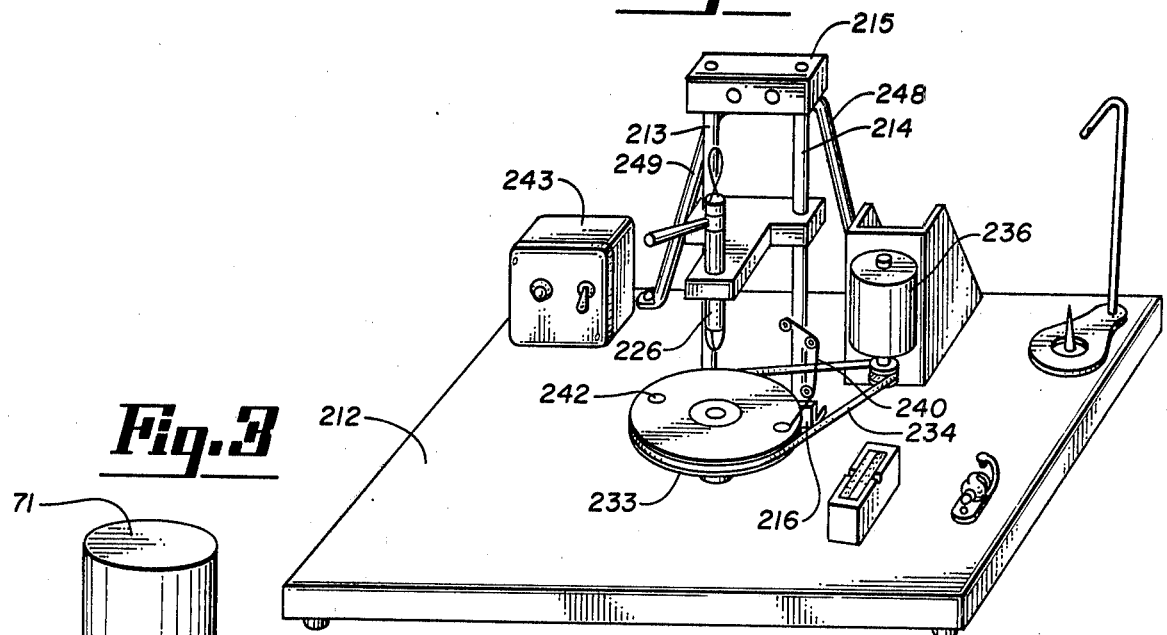
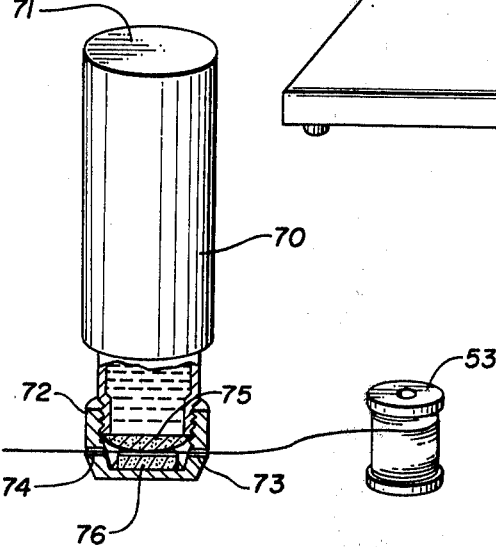
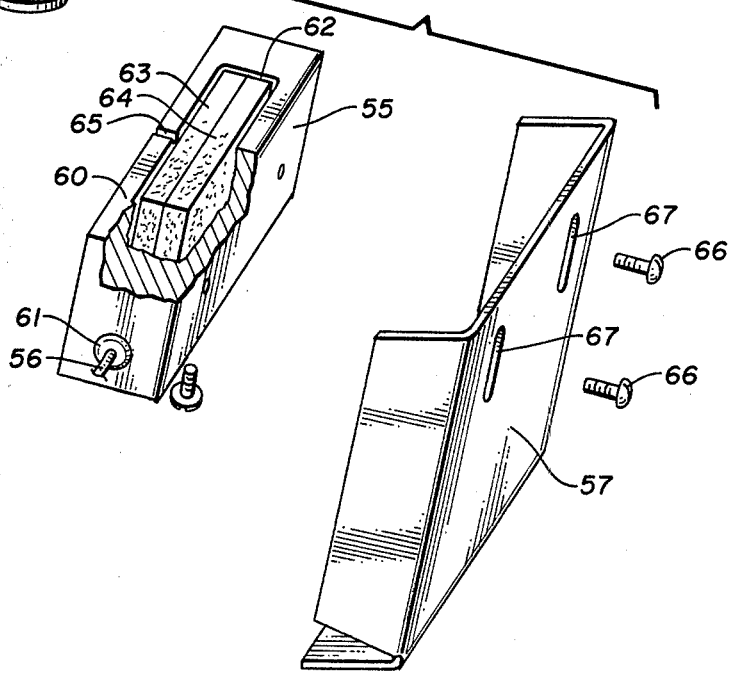

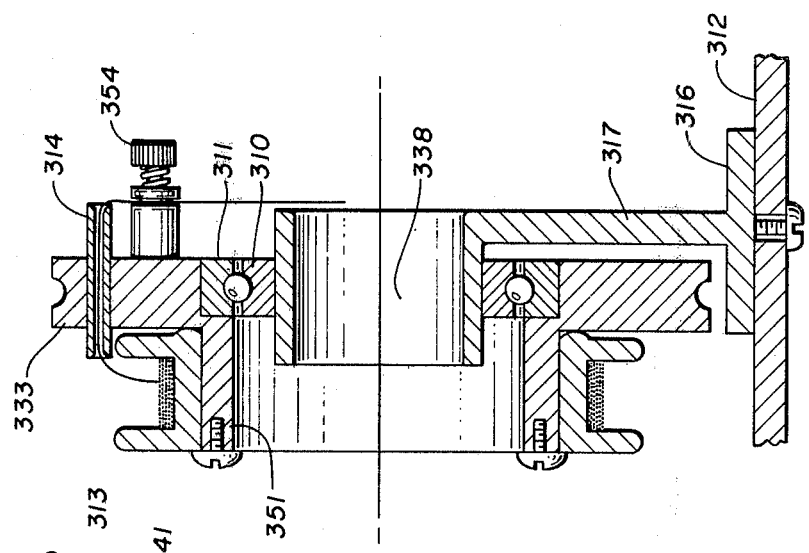
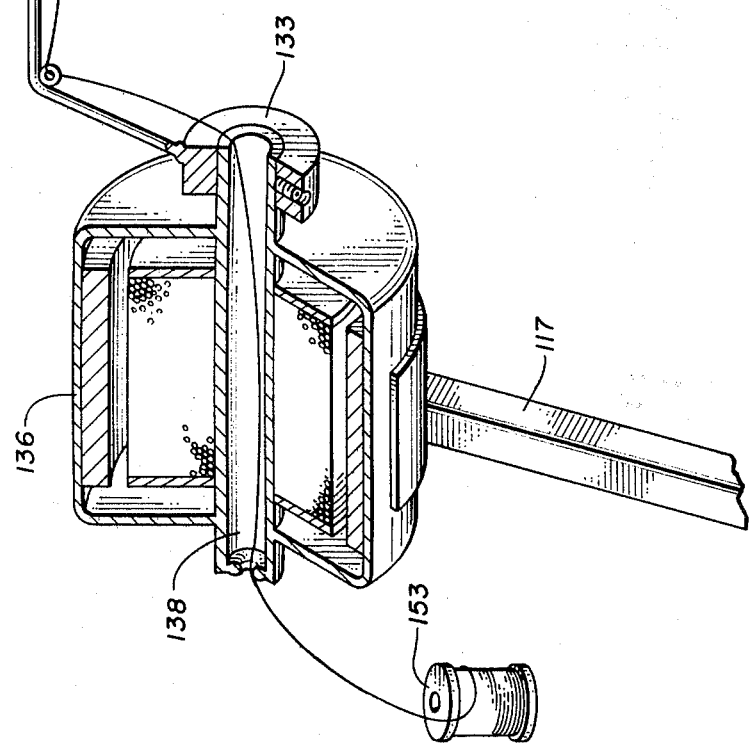

THREAD LOOPING MACHINE

This invention relates to the field of thread looping machines and more particularly to that of tying material and objects to fish lures or fishing rods.

The general practice over the years has been to form fishing lures which require some form of hair, or feathers or other similar materials to be secured to the hook, jig, or chub type lure through a hand tying operation. That is, the thread was held in the hand while the other substance to be secured to the hook or lure was generally held in place, quite often with the hand, and thread was then wound around a lure until the material was secured thereto. Tying such lures by hand does have its disadvantages and shortcomings because thread having sufficient strength is usually extremely small in diameter and tends to cut the hands and fingers of the person tying the lures. It also requires at least one hand be used to continually keep the thread or line under tension and any adhesive or preservative is usually added after the lure has been tied so that it is generally the outer surface of the binding that receives the protective coating and those layers next to the inner portion of the lure are generally not that well protected.

Problems also arise where the lure is formed with a joint that permits a portion of the lure to extend downwardly due to gravity action which places another obstacle in front of the person attempting to wind the thread on the lure.

A problem is also encountered in attempting to wind loops of thread around the line guides on a rod. That is, it is difficult to rotate the rod and line guide where the thread is in effect held stationary and because of the length of the rod, it is also difficult to wind or loop the thread by hand, around the rod and line guide.

The present invention overcomes these obstacles and difficulties and provides a mechanism and method for looping the thread around the material to be secured to the lure through a continuous winding process in which the line is maintained under tension and in which the line may be coated to provide a tied lure that is more secure and less subject to forms of rot wherein water is able to attack the thread and material. Another variation of the machine permits a jointed or double section lure to be wound where gravity is used to aid in the tying process.

Another modification of the machine permits tying of the line guides to a rod because of the openness in the work engaging area and carrying of the thread with the bail disc mechanism so that access to the work may be made from both sides of the bail disk mechanism to provide more of an unobstructed mechanism.

It is therefore a general object of this invention to provide an improved thread looping machine for tying such things as hair, feathers, and other materials on fish lures such as a jigs, the line guides on casting rods, and the like.

It is another object of this invention to provide an improved tying machine that has a bail mechanism that is substantially unobstructed in the work area of the machine.

It is still another object of this invention to provide a means of tying fish lures in which the thread is adhesively coated before the tying operation is accomplished.

It is still another object of this invention to provide an improved process of looping thread around a fixed object in which the object may be moved along an axis defined by successive loops of the thread around the object.

It is yet another object of this invention to provide a machine that can easily tie hair, feathers, or other materials to a jointed lure.

A detailed description of one preferred embodiment of the thread looping machine is hereafter described with specific reference being made to the drawings in which:

FIG. 1 is an isometric view of the invention embodied in a thread looping machine;

FIG. 2 is an isometric view of another embodiment of the invention;

FIG. 3 is a partial section of one form of thread coating device;

FIG. 4 is a partial section of another form of threading coating device;

FIG. 5 is a partial section of another form of drive mechanism; and

FIG. 6 is a partial section of another embodiment of the invention.

Turning primarily to FIG. 1, a lure tying machine 10 is disclosed in which a frame mechanism 11 is secured to a base 12. Mechanism 11 includes a pair of rods 13 and 14 that are secured in parallel fashion to a pair of end blocks 15 and 16. End block 16 has a dependent member 17 that extends upwardly. Secured to rod 14 are a pair of positioning stops 20 and 21 that function to control the longitudinal travel along rods 13 and 14 of a carriage 22. Carriage 22 also includes a depending or upright arm portion 23. Carriage 22 has a tubular portion 24 that houses a pair of ball bearings 25 to provide a freely moving carriage. The other end of carriage 22 is similarly constructed to engage rod 14.

A jig vise 26 is constructed in a tubular manner and may be one of the types sold by the Thomson Vise Company. A stem or vise arm 27 is disclosed which permits rotation of the vise in the upright arm portion. When engaged, an object such as fish hook 30 and the hair, feathers, or other material to be used therewith, are clamped in the work portion of the vise. A toggle or handle 41 actuates the chuck portion of the device to hold the object to be worked. A thumb screw 32 is disposed in depending arm 23 to engage vise 26 and adjust the vise rotational drag.

Disposed in the upper portion of depending member 17 is a circular bail disk 33 that includes an annular groove formed on the peripheral edge over which a circular cross-section belt 34 passes and is driven through a pulley 35 that is connected to a variable speed motor 36. Bail disk 33 has an open center portion in which a bearing 37 is fitted and through which a tubular member 38 passes and is secured within a bore at the end of depending member 17. A bail or bail arm 40 is secured to bail disk 33 and is in the form of an arcuate member that also includes a plurality of thread guides 41, generally formed of a hard material such as carbide. A counterbalance 42 is secured to bail disk 33 opposite bail arm 40 to reduce any rotational viabrations of the mechanism.

A control box 43 includes a speed control 44 and an on-off power switch 45. A suitable electrical connection 46 extends between motor 36 and control box 43 and another electrical connector 47 extends to a motor-speed foot-control 50. Motor 36 may be a series wound AC-DC Motor, 2M066 manufactured by the Dayton Company. The motor-speed foot-control 50 may be of the type manufactured by Mercury Electric Products Manufacturing Corp., Model 704, or a similar device manufactured by the Dayton Company.

A thread station 51 includes a thread stand 52 to which a spool of thread 53 is disposed in which the thread passes through a thread tension setter 54.

A hot waxer 55 receives the thread from the tension setter 54 and upon applying the hot wax, the thread passes through the tubular portion of tubular member 38 and through the thread guides on bail 40 so that the thread may be engaged around the hook, jig, or other fishing lure to which hair, feathers, or other devices may be secured. Hot waxer 55 is suitably connected to control box 43 through an electrical line 56 and is secured within a heat shield 57 to protect the operator.

FIG. 4 discloses the hot waxer 55 and heat shield 57 in more detail. The hot waxer 55 has an outer housing 60 that includes a heating element 61 secured in the bottom thereof with appropriate electrical connections to control box 43. A reservoir 62 includes a pair of felt pads 63 and 64 over which a hot wax solution is disposed. Felt pads 63 and 64 are saturated with the hot wax upon melting and the thread is drawn through a notch 65 formed in the upper portion of housing 60 while in contact with the felt pads. The height of the hot waxer 55 may be adjusted with respect to heat shield 57 by loosening a pair of mounting screws 66, moving housing 60 and retightening screws 66 that extend through a pair of elongated slots 67 formed in heat shield 57. Heat shield 57 is secured to the base of the mechanism through suitable means such as machine screws or bolts.

With reference to FIG. 3, it may be more desirable in some instances to use an adhesive dispenser dispensing a form of resin or substance such as a liquid polyurethane. Under such conditions, a mounting bracket is used in place of heat shield 57 to support an adhesive dispenser 70 that is made of a receptacle 71 containing the liquid substance and a cap 72 through which a pair of bores 73 and 74 are formed at right angles to the longitudinal axis of the container. A pair of felt pads 75 and 76 are disposed above and below the horizontal bores 73 and 74 through which thread is drawn and thus the thread is coated with the substance as it is drawn through the cap. Because the receptacle 71 has no other vent, the substance does not flow excessively but only when the thread is drawn through the bores between the pads. The quantity of fluid dispensed on the thread can be adjusted by twisting the cap with respect to the receptacle to change the pressure on the felt pads 75 and 76.

A modification of the mechanism shown in FIG. 1 is disclosed in FIG. 5 in which there is disclosed a variable speed motor 136 that is secured to a support 117. Motor 136 has a hollow shaft 138 through which thread from a spool 153 passes therethrough and a bail disk 133 is secured to hollow shaft 138 and the thread is then contained within a plurality of thread guides 141 that are secured to a bail arm 140. This mechanism thus eliminates the belt drive and the larger bail disk. The bail disk 133 is secured to tubular member 138 through suitable means such as a set screw and may be counterbalanced in the same manner as previously described should it so be desired.

FIG. 2 discloses a modification of the machine seen in FIG. 1 by extending a pair of rods 213 and 214 vertically from the frame base 216, that may be reenforced by suitable bracket means. The advantage of such an arrangement is that a vise 226 may hold a jointed lure and the end portion will hang downwardly and will not interfere with the operation of a bail 240 secured to a bail disk 233. A pair of additional support rods 248 and 249 help secure a block 215 to a base 212. The other components are adapted to be used with the vertical arrangement of the components shown in FIG. 2 just described.

FIG. 6 discloses an alternate version of the invention in which the bail disk, tubular member, spool, and thread tensioner are arranged in a different configuration to produce a device in which there is little restriction upon the length of the object or work overwhich the thread is to be looped. In other words, the device shown in FIG. 6 may be very useful in tying the fishing rod line guides or eyes through the use of spinning a bail disk 333 about a casting rod. As disclosed, bail disk 333 has an annular groove on the outside periphery thereof to turn the entire mechanism in the manner previously described, however, a tubular member 338 has a rather large bore in the center thereof and is supported by a depending member 317 which is anchored to a base frame member 316 that is secured to the machine base 312 through suitable means such as machine screws or bolts. A large diameter bearing 310 has its inner race secured about tubular member 338 and its outer race is fitted into an annular recess 311 formed in bail disk 333. To further enhance the operation, a thread spool 313 having a U-shaped cross-section is slidably and rotatably secured to a thread station 351 which may be in the nature of an annular flange or a plurality of posts to which suitable means such as retaining screws are secured to keep thread spool 313 from slipping from the thread station 351. That is, as thread is drawn from the spool, the thread spool rotates with respect to disk 333, the thread spool being held in place by the hub arrangement of the thread station and retaining screws. As thread is drawn from spool 313, it passes through a tubular guide member 314 that is placed in a transverse bore near the outer periphery of bail disk 333 and the thread is then drawn on the opposite side of disk 333 through a thread tensioner 354 where it is then available to be wrapped around the various eyelets or line guides of a fishing rod or may be wrapped around the lures which are held in place in a vise as described previously. Through the use of this mechanism, the operator has access from both ends of the device along the center line enabling the operator to hold the part being tied at both ends if necessary. Through such an arrangement, the center line is "endless" allowing the tying of very long objects or work pieces.

In carrying out the process or method of tying a fly or similar fishing lure, it may be accomplished by first securing the hook or lure to which the hair, feathers, or tinsel is to be secured, having the longitudinal axis extending along the body of the hook and permitting motion only along the longitudinal axis or in a rotational manner about the axis. One end of the thread is then secured to the lure and the thread is placed under tension after which it is continuously coated with a protective or adhesive coating substance and while under tension, is continuously looped about the hook body or the lure until the material to be secured is secured to the lure.

In considering this invention it should be remembered that the present disclosure is illustrative only and the scope of the invention should be determined by the appended claims.

I claim:

1. A thread looping machine comprising:
   (a) a frame mechanism having a longitudinal guideway;
   (b) a carriage slidably secured to said longitudinal guideway having a dependent member spaciously disposed from one end of said longitudinal guideway;
   (c) a vise secured to said dependent member near its end having a work gripping portion extending generally towards said one end of said longitudinal guideway;
   (d) a circular bail mechanism including a tubular member extending through said circular bail mechanism substantially parallel to said longitudinal guideway and secured to said frame mechanism, said circular bail mechanism being rotably disposed on said tubular member in spaced and confronting relationship to said vise;
   (e) a thread station constructed and arranged outside said carriage to receive a spool of thread and including thread tension means applying tension to thread passing therethrough;
   (f) and a drive mechanism operably connected to said frame mechanism and to said circular bail mechanism to rotate the bail and any thread around any work in said work gripping portion of said vise.

2. The structure of claim 1 including:
   (g) a bail arm secured to said circular bail mechanism extending towards said vise and having a plurality of thread loops secured thereto for containing thread therein.

3. The structure of claim 2 including:
   (h) a thread coating device having a reservoir for receiving a thread coating substance and having a passageway formed therein through which thread may pass from said thread station and continue through said tubular member and plurality of thread loops on said bail arm.

4. The structure of claim 3 wherein said longitudinal guideway is vertically oriented and said carriage, vise, and circular bail mechanism are operably disposed to cooperate therewith.

5. The structure of claim 2 wherein said coating device includes a hot wax applicator.

6. The structure of claim 2 wherein said coating device includes an adhesive applicator.

7. The structure of claim 1 including:
   (i) a thread guide secured transversely through said circular bail mechanism permitting thread to extend from the spool to the other side of said circular bail mechanism, said thread tension means being disposed on the other side of said circular bail mechanism to apply tension to thread passing therethrough.

8. The structure of claim 7 wherein said thread station is disposed on one side of said circular bail mechanism and contains the spool of thread while permitting relative rotation with respect to said thread station.

9. The structure of claim 1 including:
   (j) a counterbalance secured to said circular bail mechanism to reduce its rotational vibrations.

10. The structure of claim 1 including:
    (h) at least one positioning stop movably secured to said frame mechanism to control the longitudinal travel of said carriage.

11. The structure of claim 1 wherein said drive mechanism includes a variable speed drive motor having said tubular member forming said drive motor shaft.

* * * * *